(12) United States Patent
Livingston

(10) Patent No.: US 6,556,310 B1
(45) Date of Patent: Apr. 29, 2003

(54) METHOD AND APPARATUS FOR USING ANIMATED GRAPHICS TO REPRESENT TWO-SIDED PRINTING

(75) Inventor: Kris R. Livingston, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/488,356

(22) Filed: Jan. 18, 2000

(51) Int. Cl.[7] ............................................. G06K 15/00

(52) U.S. Cl. ....................................................... 358/1.18

(58) Field of Search ............................... 358/1.15, 1.18, 358/1.1, 1.12, 1.16; 399/75, 81, 83, 85, 362, 408; 345/700, 716, 810, 835; 707/527

(56) References Cited

U.S. PATENT DOCUMENTS 6,026,416 A  *  2/2000  Kanerva et al. ............ 707/515

* cited by examiner

Primary Examiner—Arthur G. Evans

(57) ABSTRACT

A computer implemented printer control system includes memory configured to provide an operating system and operative to store files representing at least one document to be printed and a display configured to provide an image of a graphical user interface in a viewing window. The graphical user interface is configured to convey information describing a relationship between matter to be printed on a first side of a page and matter to be printed on a second side of the page. The control system also includes processing circuitry configured to display, in the graphical user interface, a print preview image of a page to be printed and to display, together with the print preview image, an icon providing an indication of which binding option has been selected for a document that includes the page.

20 Claims, 5 Drawing Sheets

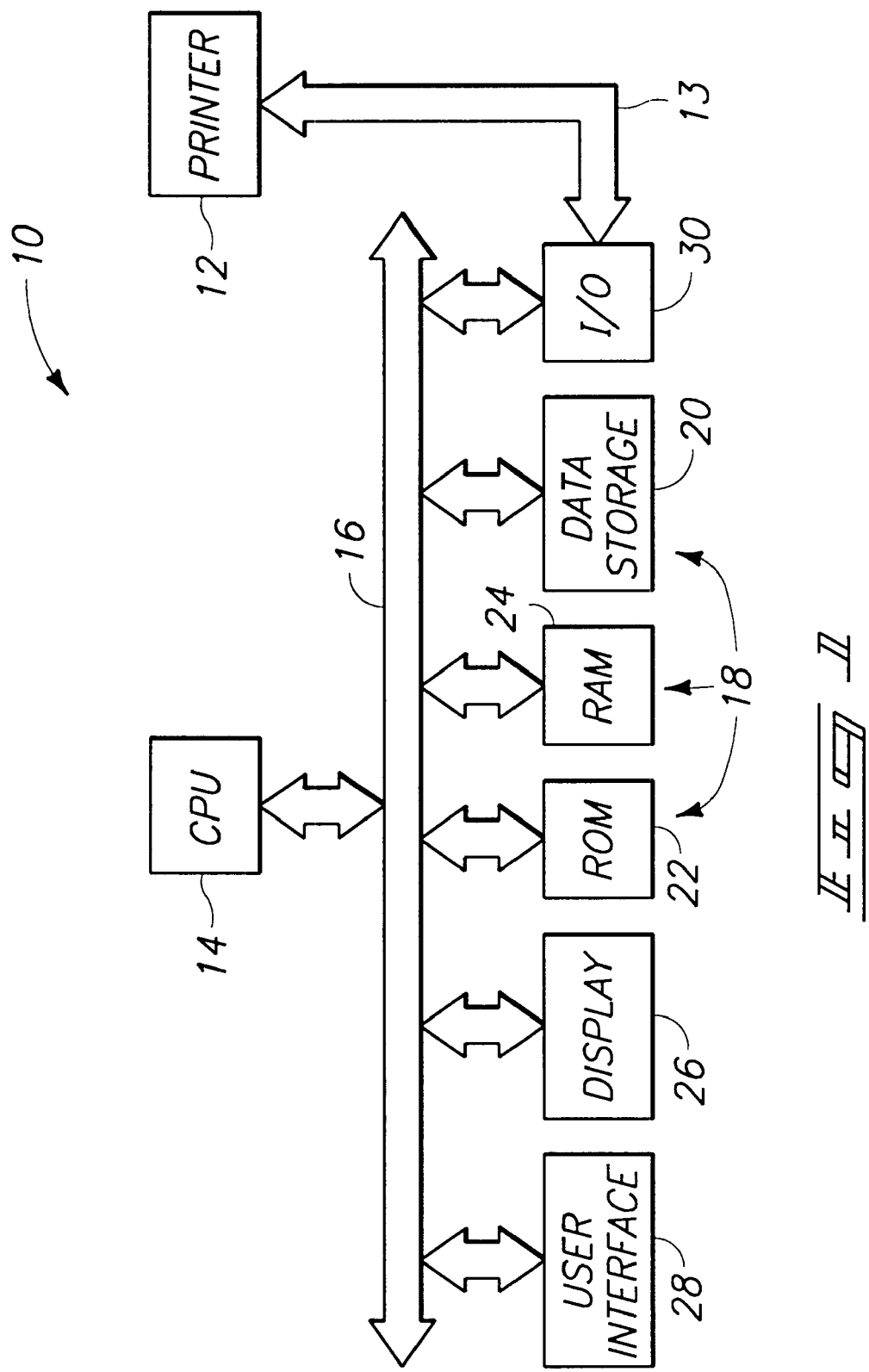

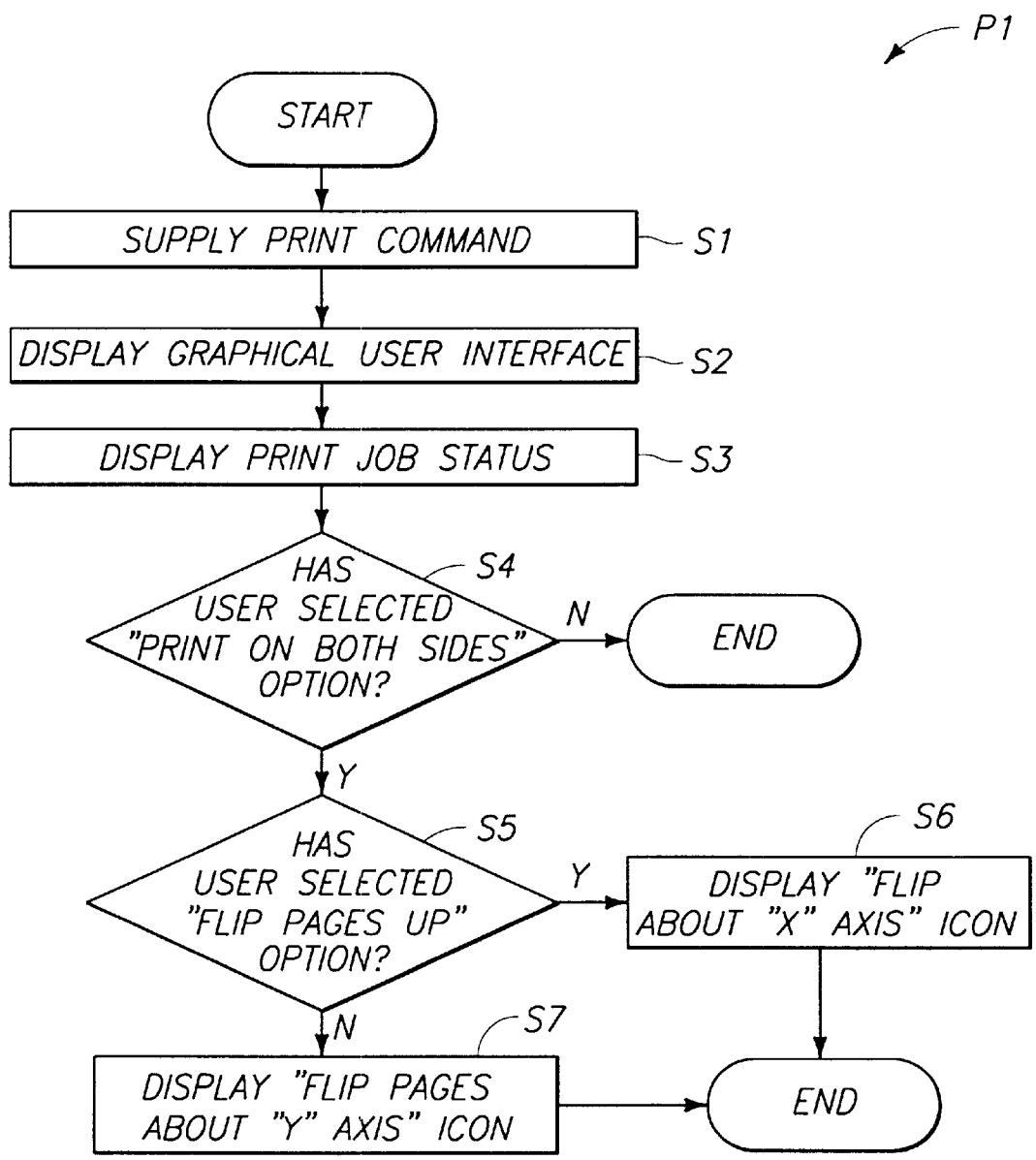

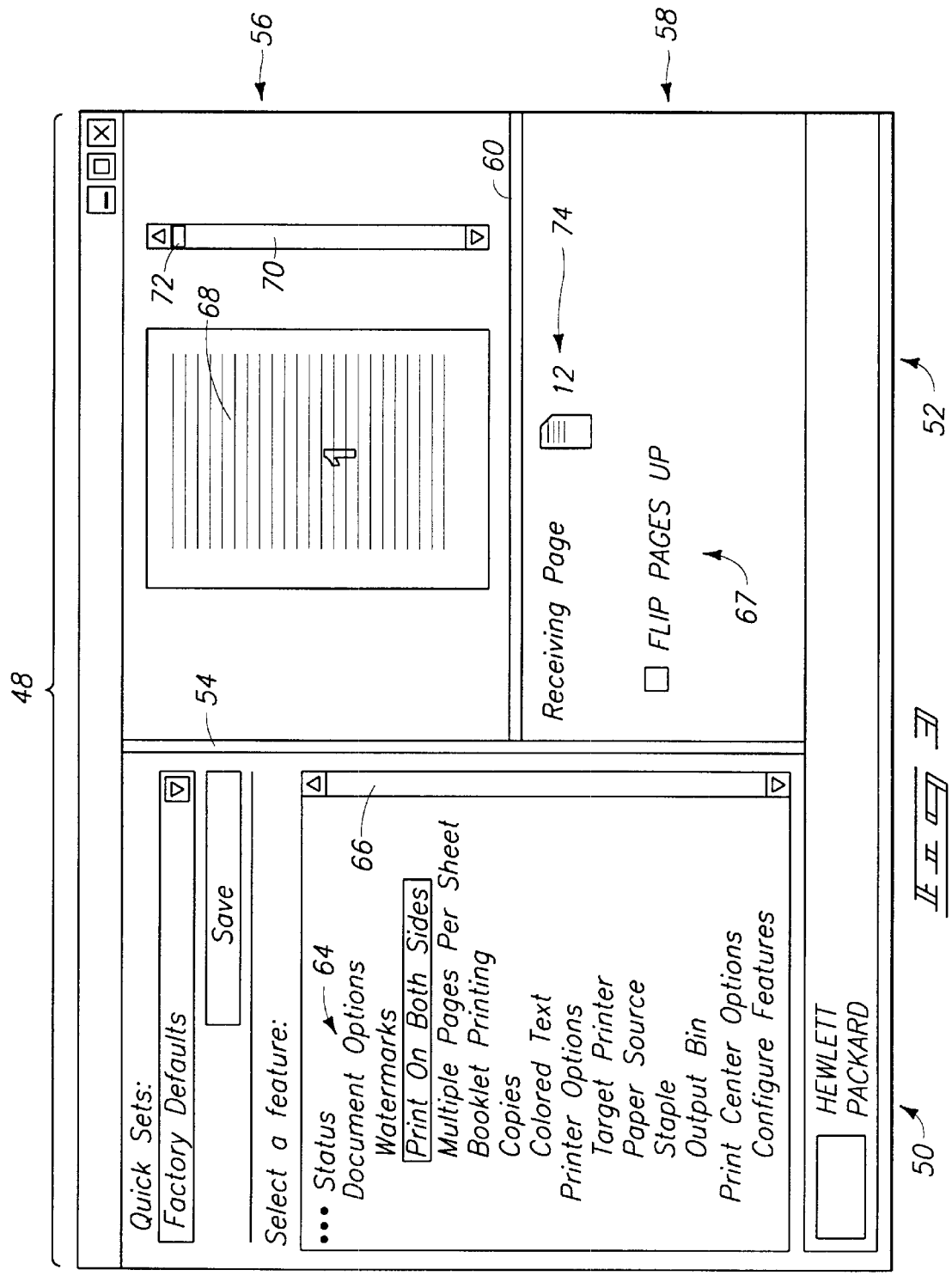

METHOD AND APPARATUS FOR USING ANIMATED GRAPHICS TO REPRESENT TWO-SIDED PRINTING

FIELD OF THE INVENTION

The invention relates to printers and computer networks. More particularly, the invention relates to displaying selected print features for a document selected for printing.

BACKGROUND OF THE INVENTION

The increased capabilities found within modern printer systems require increased sophistication in the commands that are sent to the printer in order to effectuate desired print options. In turn, the user has a larger number of options to select from in composing a document to be printed. As a result, the need to be able to organize and to display printer options in a compact, organized, informative and user-friendly fashion has grown dramatically.

Typically, a print job is sent to a printer, and the user is provided with a status dialog box. The printing software carries out preliminary processing of the print job in order to be able to send formatted pages from the print job to the printer. While the print job is being processed, the software displays the status of the print job in the status dialog box. While the status is being displayed, the user has the options of letting the printing software continue to process the print job without intervention, canceling the print job or suspending the print job temporarily while the user reviews or modifies various printing options.

Some modern printers include double-sided or duplex printing in addition to single-sided or simplex printing as an option. When the print options include duplex printing in addition to simplex printing, it is necessary to distinguish between those binding options that are possible for duplex printing.

A first binding option is called "long edge" binding and corresponds to a document having pages or leaves that are secured together along the long edge of the leaves. In order for text to flow correctly when long edge binding is desired together with portrait mode printing, the printing on both sides of the page is oriented so that the top of the leaf for one side is the same as the top of the leaf for the other side.

A second binding option is called "short edge" binding and corresponds to a document having leaves that are secured together along the short edge of the leaves. In order for text to flow correctly when short edge binding is desired together with portrait mode printing, the printing on the front (or odd-numbered) side of the leaf is oriented so that the top of the leaf for the front side is also the bottom of the leaf for the reverse side. Thus, selecting the wrong binding option will cause the back, reverse or even-numbered side of the page to be upside down relative to the front, obverse or odd-numbered side of the page when the document pages are turned in the way that the user had intended.

Traditional graphics displays provide a print preview image of the document being printed. In order to indicate that the reverse side is not blank, these displays rely on creative techniques using graphical ornaments, such as showing a "dog-eared" corner, or a binding device such as a spiral wire binding, staples or a loose-leaf binder. However, these solutions do not actually show what is on the other side of the page, and they may not provide a clear indication of the binding option. Another approach is to show two static images side-by-side, where one image represents the obverse side of the page and the other image represents the reverse side of the page. However, this type of static display fails to show how the page was turned to go from the one image to the other.

What is needed is a way to provide a two-dimensional display that clearly communicates to a user how a duplex print job is being printed.

SUMMARY OF THE INVENTION

In accordance with an aspect of the present invention, a method of displaying a print preview image conveying information describing a relationship between matter to be printed on a first side of a page and matter to be printed on a second side of the page includes displaying a print preview image of a page to be printed and displaying, together with the print preview image, an icon providing an indication of which binding option has been selected for a document that includes the page.

In accordance with another aspect of the present invention, an article of manufacture includes a computer usable medium having computer readable code embodied therein to cause a display to display information describing a relationship between matter to be printed on a first side of a page and matter to be printed on a second side of the page. The computer readable program code in the article of manufacture is configured to display, in the graphical user interface, a print preview image of the page to be printed and to display, together with the print preview image, an icon providing an indication of which binding option has been selected for a document that includes the page.

In accordance with yet another aspect of the present invention, a computer implemented printer control system includes memory configured to provide an operating system and operative to store files representing at least one document to be printed and a display configured to provide an image of a graphical user interface in a viewing window. The graphical user interface is configured to convey information describing a relationship between matter to be printed on a first side of a page and matter to be printed on a second side of the page. The system also includes processing circuitry configured to display, in the graphical user interface, a print preview image of the page to be printed and to display, together with the print preview image, an icon providing an indication of which binding option has been selected for a document that includes the page.

Other features and advantages of the invention will become apparent to those of ordinary skill in the art upon review of the following detailed description, claims and drawings.

DESCRIPTION OF THE DRAWINGS

FIG. 1 is a simplified block diagram of a computer system and printer, in accordance with an embodiment of the present invention.

FIG. 2 is a simplified flowchart illustrating a process, in accordance with an embodiment of the present invention.

FIG. 3 shows a simplified view of an exemplary graphical user interface for controlling the printer of FIG. 1 using the process shown in the flow chart of FIG. 2, in accordance with an embodiment of the present invention.

DETAILED DESCRIPTION OF THE INVENTION

Figure 4H:
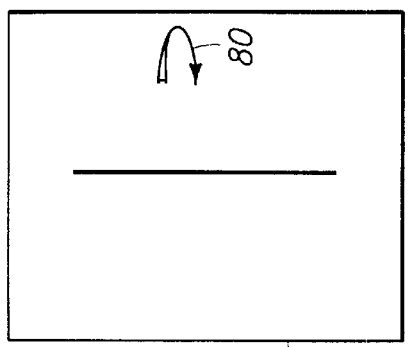
FIGS. 4A–4G show an exemplary set of sequential frames that may be displayed in a graphical user interface such as that of FIG. 3 to demonstrate a choice of a binding option involving flipping about a "y" axis, in accordance with an embodiment of the present invention.

FIG. 1 is a simplified block diagram of a computer system 10 and printer 12 coupled together via a bus 13, in accordance with an embodiment of the present invention. The computer system 10 includes a central processing unit (CPU) 14 that is coupled to a data and address bus 16. The data and address bus 16 is coupled to a memory system 18. The memory system 18 includes nonvolatile mass data storage device 20, which may include a CD ROM, floppy drive, hard drive, zip drive, floptical storage, optical storage, tape storage or other forms of data storage and retrieval devices known in the art.

The memory system 18 also includes a read only memory (ROM) 22 and a random access memory (RAM) 24. In one embodiment, the computer system 10 includes the memory system 18 or other computer readable medium bearing software that will be described below.

A display 26 and a user interface 28 are also coupled to the CPU 14 through the data and address bus 16. The computer system 10 includes I/O devices 30 coupled to the data and address bus 16 to promote data communications between the computer system 10 and external data processing and conditioning devices, including the printer 12. It will be appreciated that more complex computer systems are also used in conjunction with printers 12, however, for clarity of explanation and ease of understanding, the present invention will be described in the context of the computer system 10 of FIG. 1.

In one embodiment, the user interface 28 includes a keyboard and a cursor manipulating tactile input device, such as a mouse or a touchpad. However, it is understood that other forms of input devices can also be used including voice recognition systems, joysticks, graphics tablets, data readers, card readers, magnetic and optical readers, other computer systems etc. The user receives visual feedback via the display 26.

According to one construction, the display 26 comprises a graphics display terminal, such as a CRT display or a liquid crystal display. The user enters commands and text via the user interface 28 and observes feedback from the computer system 10 using the display 26. The CPU 14 operates on data using modules composed of lines of code that typically are stored in RAM 24, in response to the commands from the user. The CPU 14 then provides results that may be stored in the memory system 18, displayed on the display 26 or that may be communicated to other devices external to the computer system 10, such as the printer 12. The modules may or may not be defined by a subroutine separate from a main program. It will be understood that while the invention is described in terms of a computer system 10 and a printer 12, it may also be practiced in systems that include multiple computers, such as servers and the like.

FIG. 2 is a simplified flowchart illustrating a process P1 in accordance with one aspect of the invention. The process P1 begins with a step S1.

In the step S1, the user supplies a print command. The print command causes the computer 10 to organize and send a file describing the document to be printed and the selected print options to the printer 12 to print the job, and to provide displays informing the user of the features selected for the print job as well as keeping the user apprized of the print job status.

In a step S2, the process P1 displays a graphical user interface, for example on the display 26. The graphical user interface may be such as that shown in FIG. 3, with a "Status" feature selected from a list of user-selectable features. The graphical user interface includes a print preview image and controls for a selected feature.

In a step S3, the process P1 displays the current status of the print job in the graphical user interface.

In a query task S4, the process P1 determines whether the user has selected the "Print On Both Sides" option from a list of features in the graphical user interface of FIG. 3. When the query task S4 determines that the "Print On Both Sides" option has not been selected, the process P1 ends.

When the query task S4 determines that the "Print On Both Sides" option has been selected, a query task S5 determines if a "Flip Pages Up" binding option has been selected.

When the query task S5 determines that the "Flip Pages Up" binding option has been selected, a step S6 causes one or more icons indicative of the binding option involving flipping about the "x" axis to be displayed.

When the query task S5 determines that the "Flip Pages Up" binding option has not been selected, a step S7 causes one or more icons indicative of the binding option involving flipping about the "y" axis to be displayed. In either case, the process P1 then ends.

FIG. 3 shows a simplified view of a graphical user interface 48 for controlling the printer 12 of FIG. 1 using the process P1 shown in the flow chart of FIG. 2, in accordance with an embodiment of the present invention. FIG. 3 shows a first screen portion 50 and a second screen portion 52 separated by a first divider 54.

In one embodiment, the second screen portion 52 is separated into a first sub portion 56 and a second sub portion 58 separated from one another by a second divider 60.

A list 64 of printer features is displayed in the first portion 50, together with a scroll bar 66. This allows the user to rapidly scan features in the list 64 and to select features in the list 64 for modification from their default settings, using, for example, a mouse-driven cursor. When the user selects a feature from the list 64, that feature is shown in a visually distinct manner in the list of features 64. Selection of a feature from the list 64 will cause controls displayed in the second sub portion 58 to change to controls appropriate for the feature that is currently selected.

For example, when the user selects the "Print On Both Sides" option, as indicated by the box surrounding this option in the list of options 64, the second sub portion 58 displays a "Flip Pages Up" control 67. Use of a "Flip Pages Up" option, rather than selection of "long edge" or "short edge" options, allows both portrait and landscape mode printing to be straightforwardly addressed through a single control without confusion.

The first sub portion 56 displays a print preview image 68. The first sub portion 56 also displays a scroll bar 70 together with a scroll button 72. The scroll bar 70 allows the user to select a specific page in the document for the print preview image 68, using, for example, a mouse-driven cursor. The print preview image 68 shows an image corresponding to the selected page as it will appear when it is printed.

Figure 4G:
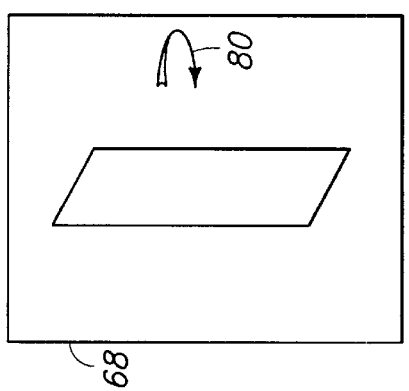
Figure 4D:
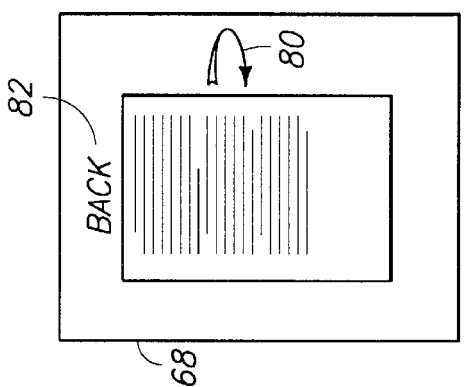
Figure 4E:
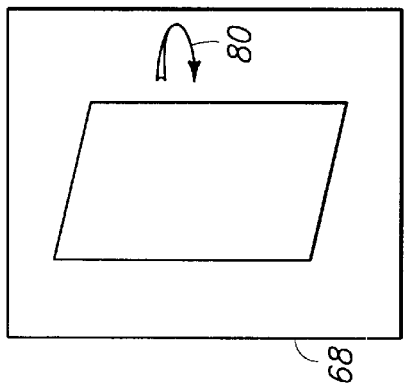
Figure 4F:
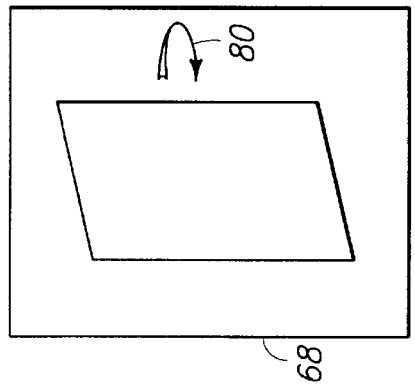
Figure 4A:
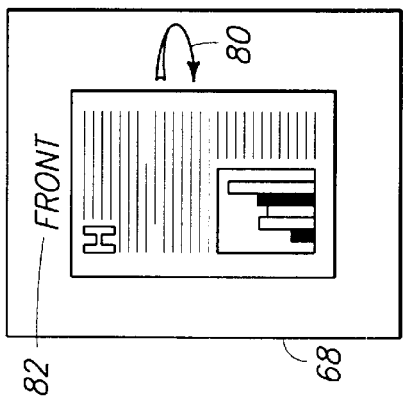
Figure 4B:
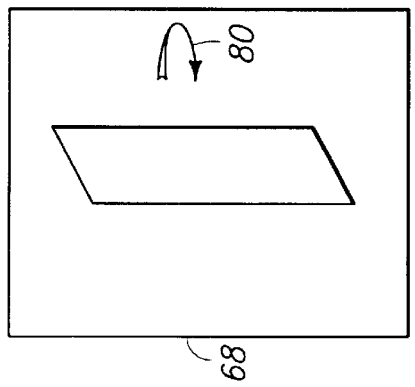
Figure 5D:
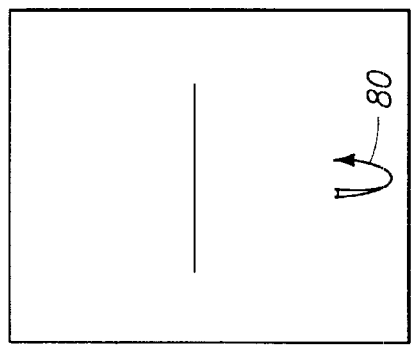
FIGS. 5A–5G show an exemplary set of sequential frames that may be displayed in a graphical user interface such as that of FIG. 3 to demonstrate a choice of a binding option involving flipping about an "x" axis, in accordance with an embodiment of the present invention.
Figure 5C:
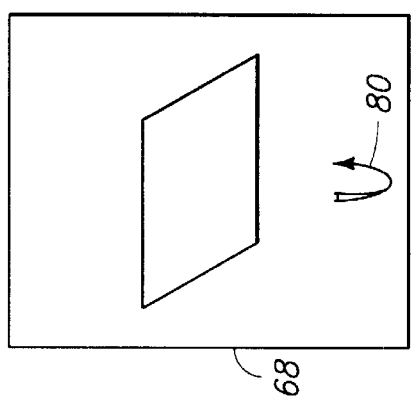
Figure 5B:
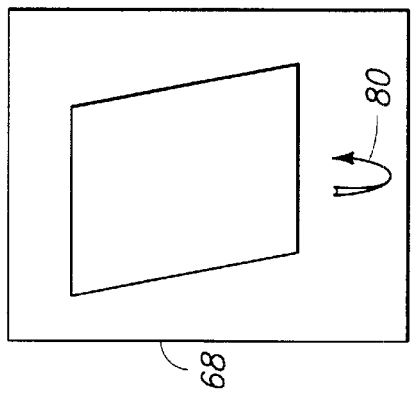
Figure 5A:
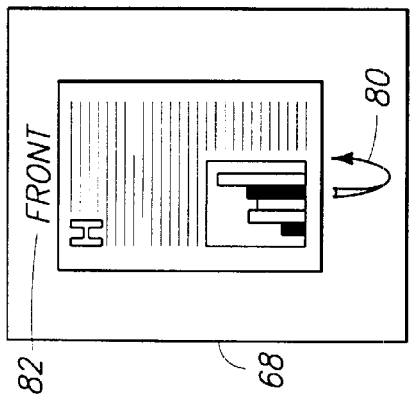
Figure 5G:
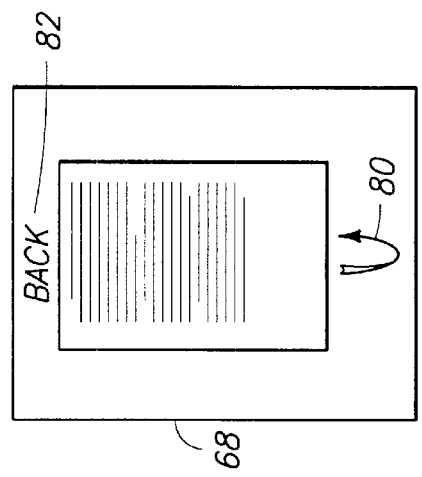
Figure 5F:
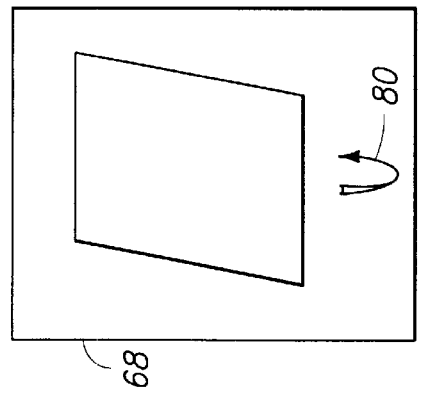
Figure 5E:
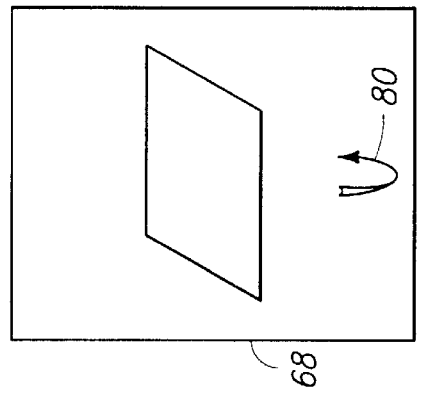

In one embodiment, a print preview image 68 such as that shown in FIG. 4A is displayed to indicate that the "Flip Pages Up" binding option has not been selected in the step S5 of FIG. 2, i.e., that the user has not checked the "Flip Pages Up" control 67 shown in the second sub portion 58. In one embodiment, the print preview image 68 includes a label "Front" to indicate that an image corresponding to the obverse side of the page is being displayed. In one embodiment, the print preview image 68 displays the page number, instead of, or in addition to, the label "Front". When the "Print On Both Sides" option has been selected in the list of options 64, the print preview image 68 also includes a special curved arrow 80 to provide an indication of the binding option that has been selected. In one embodiment, the curved arrow 80 is emphasized by being displayed in a color (e.g., blue) contrasting with the remainder of the print preview image 68. In one embodiment, the curved arrow 80 is offset with a three dimensional border (e.g., drawn on a "button") in order to visually apprize the user that this is a user-selectable command.

FIGS. 4A–4G show an exemplary set of sequential frames that may be displayed in a graphical user interface such as the graphical user interface 48 of FIG. 3 to demonstrate a choice of a binding option involving flipping about a "y" or vertical axis, in accordance with an embodiment of the present invention. In one embodiment, the images of FIGS. 4A–4G are sequentially displayed in response to the user selecting the curved arrow 80, for example with a click of a mouse. In one embodiment, the images of FIGS. 4B–4F are displayed for about 0.05 second each, resulting in an animation sequence of about 0.3 seconds. The print preview image 68 of FIG. 4G represents the reverse side of the page of the print preview image 68 of FIG. 4A. The print preview image 68 of FIG. 4D shows that the page is being flipped about the "y" axis. In one embodiment, the print preview images 68 of FIGS. 4A and 4G include indicia 82 denoting the side of the page that is being displayed. Such indicia 82 may include a page number or may include a word such as "Front" or "Back" to provide an indication of which side of the page is being displayed in the print preview image 68. In one embodiment, only the print preview images 4A and 4G include the curved arrow 80 showing flipping about the "y" axis.

FIGS. 5A–5G show an exemplary set of sequential frames that may be displayed in a graphical user interface such as the graphical user interface 48 of FIG. 3 to demonstrate a choice of a binding option involving flipping about an "x" or horizontal axis in a fashion analogous to that of FIGS. 4A–4G, in accordance with an embodiment of the present invention. In the case shown in FIGS. 5A–5G, the animation sequence corresponds to rotation about the "x" axis. In one embodiment, only the print preview images 5A and 5G include the curved arrow 80 showing flipping about the "x" axis.

It will be appreciated that while the examples of FIGS. 4A–4G and 5A–5G utilize five intermediate frames to animate the flipping sequence, more or fewer intermediate images may be employed. It will also be appreciated that greater or lesser intervals may be used for the exemplary 0.05 second per frame and 0.3 seconds for the animation sequence. It is desired that the interval be long enough that the user can distinguish the selected binding option and short enough to avoid being distracting or annoying.

The images of FIGS. 4A, 4G, 5A and 5G also provide two visual cues about the selected duplex setting and the associated binding option. The presence of the indicia 82 and the presence of the curved arrow 80 each indicate that duplexing is enabled, i.e., that the "Print On Both Sides" option has been selected from the list of options 64 (FIG. 3). When the curved arrow 80 is placed to the side of the print preview image 68, it indicates that the "Flip Pages Up" control 67 (FIG. 3) has not been selected. When the "Flip Pages Up" control 67 has been selected, the curved arrow 80 is placed at the top or bottom of the print preview image 68.

In printing software that has knowledge of the entire document, such as a post-spool job processing application, another embodiment allows the user to trigger the animation sequences of FIGS. 4A–4G or 5A–5G by stepping through the document to be printed one page at a time. For example, the user may click on either the top or the bottom of the scroll bar 70 of FIG. 3 to move back or forward in the document to be printed one page at a time. The sequences of FIGS. 4A–4G or 5A–5G then animate the transition from odd pages to even pages when moving forward in a duplexed document (the transition from even pages to odd pages in moving forward in a document involves a new sheet of paper rather than flipping one page).

As a result, the user is visually apprized that a duplex print feature has been selected. Additionally, the user is able to easily examine the front and back sides of the page to be printed. Further, the binding option that has been selected is readily apparent to the user. The animation provides additional visual feedback to the user describing how the page is flipped.

The protection sought is not to be limited to the disclosed embodiments, which are given by way of example only, but instead is to be limited only by the scope of the appended claims.

What is claimed is:

1. A method of displaying a print preview image conveying information describing a relationship between matter to be printed on a first side of a page and matter to be printed on a second side of the page, comprising:

displaying a print preview image of a page to be printed; and displaying, together with the print preview image, an icon providing an indication of which binding option of multiple selectable binding options has been selected for a document that includes the page.

2. The method of claim 1, wherein displaying an icon providing an indication of which binding option has been selected includes displaying a curved arrow indicating rotation about a vertical axis relative to the print preview image when an option to flip pages up has not been selected.

3. The method of claim 1, wherein displaying an icon providing an indication of which binding option has been selected includes displaying a curved arrow indicating rotation about a horizontal axis relative to the print preview image when an option to flip pages up has been selected.

4. The method of claim 1, further comprising displaying indicia denoting which side of the page is being shown in the print preview image.

5. The method of claim 1, further comprising, in response to user input, displaying a sequence of images depicting rotation of the page about a vertical axis when an option to flip pages up has not been selected.

6. The method of claim 1, further comprising, in response to user input, displaying a sequence of images depicting rotation of the page about a horizontal axis when an option to flip pages up has been selected.

7. The method of claim 1, further comprising including, in the icon, a user-selectable control for initiating an animation sequence transitioning from an initial print preview image of an obverse side of the page to be printed through intermediate frames and ending with a final print preview image corresponding to a reverse side of the page that was displayed in the initial print preview image.

8. An article of manufacture comprising a computer usable medium having computer readable code embodied therein to cause a display to depict a graphical user interface including information describing a relationship between matter to be printed on a first side of a page and matter to be printed on a second side of the page, the computer readable code being configured to display a print preview image of a page to be printed and to display, together with the print preview image, an icon providing an indication of which binding option has been selected for a document that includes the page.

9. The article of manufacture of claim 8, wherein the computer readable program code configured to display an icon providing an indication of which binding option has been selected is configured to display a curved arrow indicating rotation about a vertical axis relative to the print preview image when an option to flip pages up has not been selected.

10. The article of manufacture of claim 8, wherein the computer readable program code configured to display an icon providing an indication of which binding option has been selected is configured to display a curved arrow indicating rotation about a horizontal axis relative to the print preview image when an option to flip pages up has been selected.

11. The article of manufacture of claim 8, the computer readable program code further being configured to display indicia denoting which side of the page is being shown in the print preview image.

12. The article of manufacture of claim 8, the computer readable program code further being configured to display a sequence of images depicting rotation of the page about a vertical axis when an option to flip pages up has not been selected, in response to user input.

13. The article of manufacture of claim 8, the computer readable program code further being configured to display a sequence of images depicting rotation of the page about a horizontal axis when an option to flip pages up has been selected, in response to user input.

14. The article of manufacture of claim 8, the computer readable program code further being configured to provide, in the icon, a user-selectable control for initiating an animation sequence transitioning from an initial print preview image of an obverse side of the page to be printed through intermediate frames and ending with a final print preview image corresponding to a reverse side of the page that was displayed in the initial print preview image.

15. A computer implemented printer control system for controlling printing of a document including multiple pages, respective pages having first and second sides, and for receiving a selection of a binding option from multiple possible binding options, the system comprising:

memory configured to provide an operating system and operative to store files representing at least one document to be printed;

a display configured to provide an image of a graphical user interface in a viewing window, the graphical user interface configured to convey information describing a relationship between matter to be printed on a first side of a page and matter to be printed on a second side of the page; and processing circuitry configured to display, in the graphical user interface, a print preview image of the page to be printed and to display, together with the print preview image, an icon providing an indication of which binding option has been selected for a document that includes the page.

16. The printer control system of claim 15, wherein the processing circuitry is additionally configured to display a curved arrow indicating rotation about a vertical axis relative to the print preview image when an option to flip pages up has not been selected and to display a curved arrow indicating rotation about a horizontal axis relative to the print preview image when an option to flip pages up has been selected.

17. The printer control system of claim 15, wherein the processing circuitry is additionally configured to display indicia denoting which side of the page is being shown in the print preview image.

18. The printer control system of claim 15, wherein the processing circuitry is additionally configured to display a sequence of images depicting rotation of the page about a vertical axis when an option to flip pages up has not been selected, in response to user input.

19. The printer control system of claim 15, wherein the processing circuitry is additionally configured to display a sequence of images depicting rotation of the page about a horizontal axis when an option to flip pages up has been selected, in response to user input.

20. The printer control system of claim 15, wherein the processing circuitry is additionally configured to provide, in the icon, a user-selectable control for initiating an animation sequence transitioning from an initial print preview image of an obverse side of the page to be printed through intermediate frames and ending with a final print preview image corresponding to a reverse side of the page that was displayed in the initial print preview image.

* * * * *